Feb. 9, 1954     J. C. KIRCHER, JR     2,668,411
GRASS CATCHER FOR LAWN MOWERS
Filed May 3, 1952     2 Sheets-Sheet 2
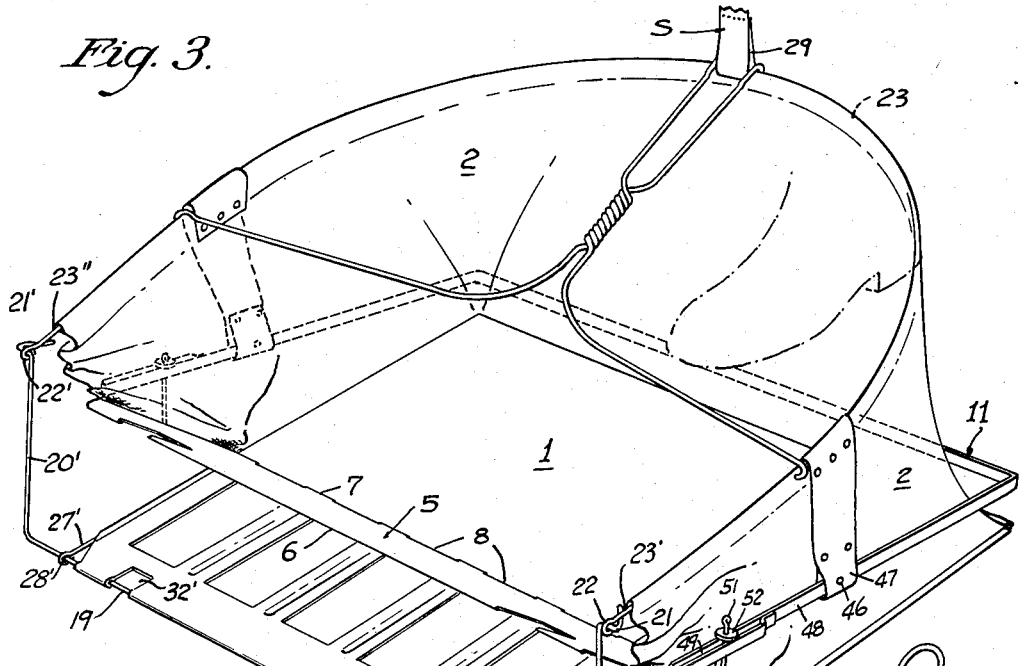
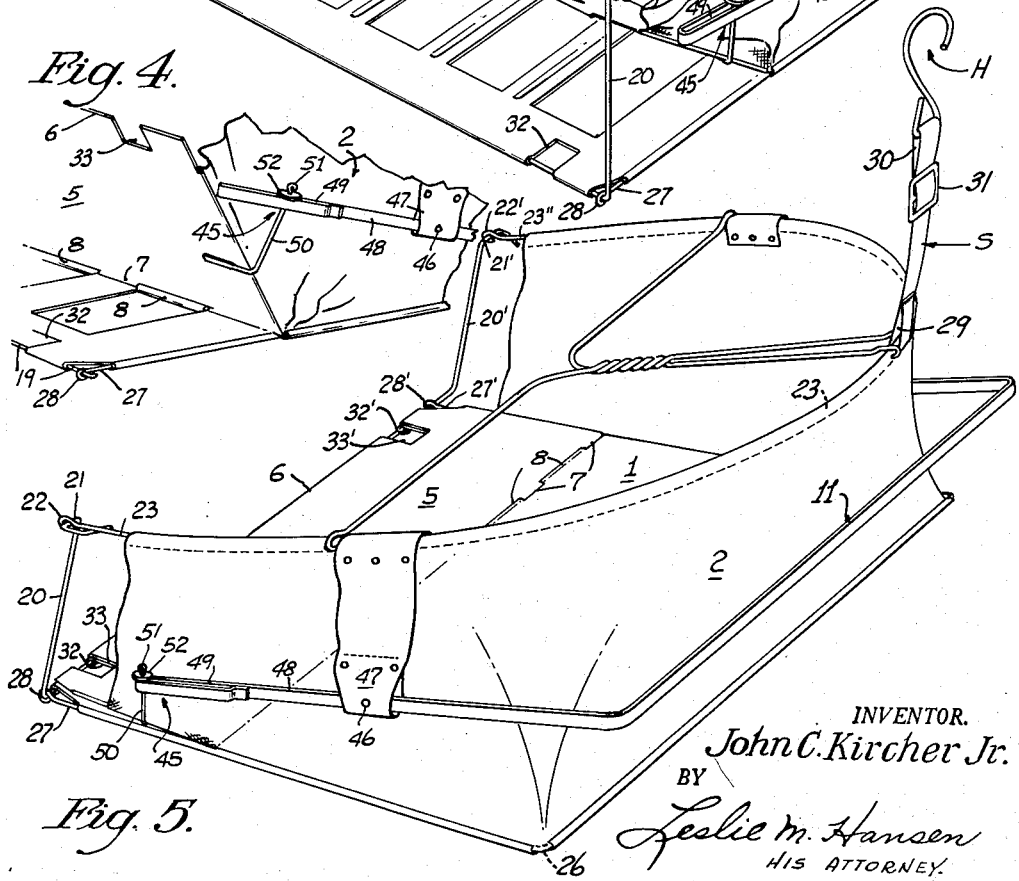
INVENTOR.
John C. Kircher Jr.
BY Leslie M. Hansen
HIS ATTORNEY.

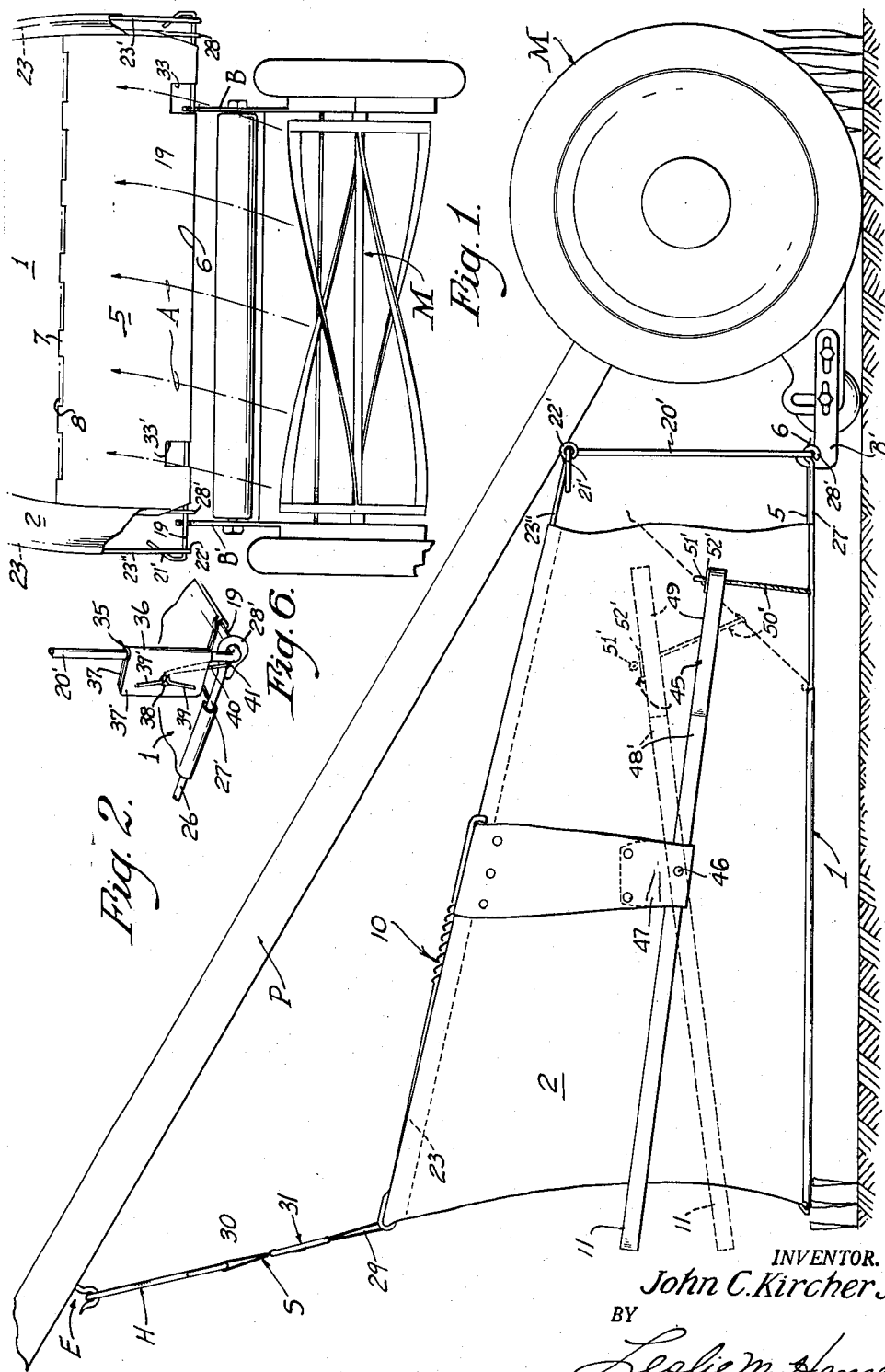

UNITED STATES PATENT OFFICE 2,668,411

GRASS CATCHER FOR LAWN MOWERS

John C. Kircher, Jr., Mountain View, Calif.

Application May 3, 1952, Serial No. 285,923

4 Claims. (Cl. 56—199)

This invention relates to grass catchers and more particularly to a grass catcher of the type having a throw plate for moving grass clippings into the rear portion of the catcher.

The present invention is related more specifically to certain novel improvements in the grass catcher structure described and claimed in my United States Letters Patent No. 2,300,934 which issued on November 3, 1942. As stated in the foregoing patent, the broad object is to provide means whereby the operator of a lawn mower can quickly and easily transfer grass clippings from the forward portion of the catcher to the rear thereof without having to apply his hands to that work In the present application, the same broad principle is employed but is refined to the extent that a more efficient operation and effective result is obtained in a novel manner. In other words, a similar throw plate is provided on the fore portion of the catcher for foot operation by the tap of one's foot upon a fulcrumed bar connected with an arm carried by the throw plate. However, in the present application a flexible or floating connection between the fulcrum bar and arm on the throw plate affords an overthrow of the throw plate without full stroke of the fulcrum bar.

It is accordingly one object of the present invention to provide a floating connection between a foot operated fulcrum bar and the throw plate of a grass catcher.

Another object is to provide a flexible linkage between the throw plate and fulcrum bar which will enable tap operation of the fulcrum bar with a resultant overthrow of the throw plate.

Another object is to provide for an offset relationship between the lawn mower and the throw plate type grass catcher to facilitate uniform gathering of grass clippings which is conducive to better operation of the throw back feature of this invention. Incidental to the foregoing object, this invention further contemplates means for conditioning the grass catcher for either right or left hand offsetting relative to the mower.

These and other objects and advantages of the present invention will become apparent from a reading of the following description in the light of the drawings in which:

Fig. 1 is a fragmentary plan view of a conventional lawn mower having attached thereto a grass catcher embodying the present invention.

Fig. 2 is an enlarged side elevational view of the grass catcher as seen from the left in Fig. 1.

Fig. 3 is a perspective view looking into the grass catcher with its throw plate raised.

Fig. 4 is a fragmentary perspective view of a portion of Fig. 3 from the same angle but from below.

Fig. 5 is a perspective view of the grass catcher of Figs. 1 to 4 from a rearward side angle and with the throw plate down.

Fig. 6 is a fragmentary perspective view of one corner of the catcher illustrating the mode of offsetting the catcher body relative to the point of connection thereof with a lawn mower.

The grass catcher embodying the novel improvements constituting the present invention, as shown in the drawings, follows the broad principle described and claimed in the aforementioned U. S. Patent No. 2,300,934. In general, the conventional grass catcher 10 has a flat sheet metal bottom 1 joined to an upper bowed frame 23 by a heavy duck canvas skirting 2. In accordance with the broad concept of my aforesaid patent the conventional grass catcher is provided with a throw plate 5 having its fore lip 6 adapted to be disposed immediately behind the lawn mower M and its rearward edge formed to provide spaced hinge bosses 7 associated with like hinge bosses 8 formed on the sheet metal bottom 1 of the grass catcher. The patented concept further provides a bar 11 which is bowed around the rear skirting of the catcher which bar is fulcrumed at the two sides thereof on a canvas sling suspended from the bowed frame 23. Each of the free forward ends of the flucrum bar 11 is connected by a linkage in turn connected to the throw plate 5.

The transverse bar 19 of the instant case is slightly longer than the width of the sheet metal bottom member 1, preferably by about two inches. This bar 19 is bent upwardly to provide vertical struts 20—20' for supporting the forward free ends 22—22' on parallel arms 23'—23''' of the bowed frame member 23. In this connection, the struts 20—20' are bent laterally outwardly as at 21—21' to receive the looped free ends 22—22' of the frame arms. Moreover, the lateral free ends 21—21' of the struts are bent rearwardly backward and under the respective arm 23'—23'' of the bowed frame 23 to aid in supporting them at a substantially obtuse angle relative to the vertical struts 20—20'.

The sheet metal bottom 1, as best illustrated in Figs. 3 and 4, extends all the way to the transverse bar 19 and is curled around the latter for sliding support thereon. The throw plate 5 in the structure of this application is somewhat deeper than the prior model from its fore lip to its hinged rearward edge so as to rely solely on gravity for maintaining the throw plate in its normally lowered position. The alternate hinge bosses 8 on the bottom member 1 are formed by cutout portions 25 therein in the portion thereof below the throw plate.

The side and rear edges of the sheet metal bottom 1 are each curled over a heavy wire bow member 26 as well as the lower extremity of the canvas skirting 2 for securing the latter to the metal bottom. The parallel forwardly extending arms 27—27' of the lower bow member 26 have their ends looped as at 28—28' around the transverse bar 19 for sliding movement therealong in addition to supporting the fore ends of the catcher bottom at the desired elevation above the lawn turf when the transverse bar 19 is supported by the rearwardly extending hooked brackets B—B' on the lawn mower M. The rearward part of the catcher is suspended from the push bar P of the mower M by a strap S having its lower end looped as at 29 around the bight of the bowed frame member 23. The upper end of a strap S is looped as at 30 by a slide buckle 31 for adjustment relative to a hook H adapted to hang over the push bar or through an eye E provided thereon (see Fig. 2).

In connection with the foregoing, it will be noted that at both sides of the catcher, the fore end of the catcher bottom 1 is cut out as at 32—32' preferably about 2 inches from the extreme side edge thereof. The fore lip 7 of the throw plate 5 is similarly cut out as at 33—33' to register with the cutouts 32—32' in the bottom member 1 to receive one or the other of the hooked brackets B or B' carried by the mower M.

As is well known, mowers are constructed to throw clippings to the right or to the left. Consequently, when the catcher is in direct alignment with the mower, the clippings are concentrated to one or the other side in the catcher. This is not conducive to the best operation of the throw plate and often requires removal of the clippings from the catcher before it is completely full. However, if the clippings are more evenly distributed within the catcher, it need be emptied less frequently. Moreover, by concentrating the clippings more toward center of the catcher, even distribution of clippings within the catcher will result when the clippings in the fore portion are thrown back into the catcher by operation of the throw plate.

The present invention contemplates more even distribution of the clippings upon operation of the throw plate. As illustrated in Fig. 6, one or the other of the looped ends 28 or 28' of the lower wire member 26 is secured in proximity to the upright strut 20 or 20', as the case may be, dependent upon the side to which the spiral sickle blades of the lawn mower will throw the lawn clippings.

The means for securing either looped end 28 or 28' to the respective strut 20 or 20' adjacent it comprises a flat piece of metal 35 in the form of a clip bent back upon itself as at 36 to fit around one or the other of the vertical struts (20 or 20'). The bend 36 is preferably such as to almost circumscribe the strut so that the two wings 37—37' of the metal piece 35 will lie flush against each other. Each wing 37—37' is provided with a hole 38 which register with one another to receive the free ends 39—39' of a wire 40. This wire 40 is adapted to have its looped end 41 strung through the loop 28 or 28' of the lower wire frame member 26 of the catcher.

From the foregoing it will be apparent that the metal securing clip 35 is adapted to be placed at either side of the fore end of the catcher dependent on the direction in which the lawn clippings are cast from the spiral sickle blades of the particular mower and into the catcher. This placement of the clip 35 is easily accomplished by spreading the wing portions 37—37' thereof sufficiently to slip the clip onto the particular strut to which it is to be connected. For example, as shown in Fig. 1, the sickle blades of the mower illustrated cast grass clippings toward the right. Therefore, the metal bottom 1 of the catcher 10 is shifted to the right along the transverse bar 19. The clip 35 is placed on the strut 20' and wire 40 strung through the loop 28' on the lefthand arm 27' of the lower wire frame member 26. As indicated by the directional arrows A in Fig. 1, the clippings will fall more or less uniformly into the catcher rather than all to one side thereof. Consequently, when the throw plate is kicked upwardly, the clippings thereon are tossed directly back into the rear portion of the catcher for more or less uniform distribution therein.

The foregoing uniform distribution of clippings on the throw plate 5, by reason of offset relation of the catcher relative to the mower, offers added effectiveness to the improved construction of the throw plate, its fulcrum bar 11, and the novel floating connection 45 therebetween and now to be explained.

As illustrated in Figs. 3 to 5 inclusive, the fulcrum bar 11 is pivoted as at 46 by a rivet extended through the canvas sling 47 which is suspended from the upper bowed frame member 23 in accordance with the teachings of my aforesaid U. S. patent. However, in the structure of this new application the free forward ends 48—48' of the fulcrum bar extend considerably beyond the point of pivotal connection of the throw plate 5 with the metal bottom 1 of the catcher. Moreover, these forward ends 48—48' of the fulcrum bar 11 are bent back upon themselves but spaced from the main body of the fulcrum bar to provide an elongated slot 49—49' respectively. The rearward ends of these slots 49—49' are closed by crimping the extreme ends of the bent back portions of the fulcrum bar toward the main portion of the latter.

A link member 50—50' at each side of the catcher has one end secured to the throw plate well in advance of the point of pivotal mounting thereof. The opposite end 51—51' of this link member 50—50' extends up through the respective elongated slot 49—49' provided at the extreme fore end of the fulcrum bar 11. The upper or said opposite end 51—51' of the link receives a washer 52—52' and is then peened or otherwise malformed to secure the washer thereon adjacent the upper surface of the fore end of the fulcrum bar. In this manner, the fulcrum bar 11 is operatively connected to the throw plate with a resulting floating connection by reason of the freedom of movement of the link member 50—50' within the elongated slot 49—49' on the fulcrum bar.

When the throw plate 5 is in its normal position the extended end 51 or 51' of the link as well as the washer 52—52' thereon is disposed in the extreme forward zone of the elongated slot 49 or 49' (Figs. 2 and 5). This makes for a maximum of leverage and quicker reaction of the throw plate 5 to the downward thrust of the bight portion of the fulcrum bar at the tap of the operator's foot. Moreover, as momentum of the throw plate as well as its load of clippings is gained, the fore lever portion 48—48' of the fulcrum bar is gradually shortened as illustrated in Figs. 3 and 4, or if the operator has hit the fulcrum bar with a quick but positive tap of his foot, the floating connection between the linkage 50—50' and the fulcrum bar is such as to allow the throw plate to continue toward full stroke position irrespective of whether the fulcrum bar has been carried through to full stroke position.

This latter feature is important because a quick tap of the foot on the fulcrum bar does not require the operator to stop in order to work the throw plate. Thus the operator can develop a technique of operating the fulcrum bar while in his stride whether he does it by foot, by hand or in any other manner with a quick tap.

It should here be noted that the link 50—50' need not be a rigid, i. e., solid wire element but can be a flexible cable which will yield to the twist or torque to which the linkage may be subjected by frequent use. In this manner, the anchorage of the lower end of the link 50—50' to the lower face or side edge of the throw plate will not be broken and continued use of the throw plate thereby is afforded.

Since the offsetting of the catcher 10 relative to the mower M spreads the grass clippings more uniformly over the throw plate, there is a more equalization of the burden on both link members 50 and 50' rather than on one or the other alone. It will therefore be seen that a greater advantage is attained with the improved floating connection in combination with the offsetting of the catcher body relative to the mower; a quicker and more instant operation is afforded by reason of the floating connection between the linkage 50—50' and the fore end 48—48' of the fulcrum bar; and the clippings thereby are tossed back into the catcher with greater ease and less effort on the part of the operator.

While I have described the improved construction for throw plate type grass catchers in specific detail, it will be apparent to those skilled in the art that structurally it may be varied, altered or modified without departing from the spirit of this invention. I, therefore, desire to avail myself of all variations, alterations and/or modifications as fairly come within the scope of the appended claims.

I claim:

1. In a lawn mower grass catcher of the type having a throw plate extending across the fore end of its bottom and hingedly connected to said bottom at the rearward edge of said throw plate; means for offsetting said catcher to one or the other side of the mower to which it is attached dependent upon the direction of throw of the clippings from said mower into said catcher for effecting uniform distribution of said clippings on said throw plate comprising a forward transverse bar on said catcher for supporting the fore edge of the bottom thereof, said transverse bar being of a length slightly greater than the width of the bottom of said catcher to afford sliding movement thereof to one or the other extreme end of said transverse bar, and means for securing said bottom of said catcher to that end of said transverse bar to which it is moved.

2. In a grass catcher adapted to be coupled to a pair of connecting hooks extending rearwardly from a lawn mower, said grass catcher being of the type having a throw plate extending across the fore end of its bottom and hingedly connected to said bottom at its rearward edge; the combination therewith of a transverse bar for supporting the fore edge of the bottom of said catcher for sliding movement to one or the other side off center relative to said lawn mower, the bottom of said catcher having a cut-out portion spaced inwardly of and adjacent each of its extreme side edges for receiving one only of said rearwardly extending connecting hooks on said mower while the other one of said hooks will receive said transverse bar outside the opposite side edge of said bottom dependent upon the direction in which grass clippings are cast from said mower into said catcher for attaining substantially uniform distribution of said clippings on said bottom and said throw plate.

3. In a throw plate type grass catcher adapted for coupling to a pair of rearwardly extending hooks on a lawn mower which grass catcher has an upper bow member joined to a lower bow member and the bottom of said catcher by a canvas skirting or the like; the combination therewith of a transverse bar for slidably supporting the fore edge of the bottom of said catcher, said transverse bar being of a length slightly greater than the width of said bottom and bent upwardly to provide upstanding struts for supporting the forward extremities of the upper bow member of said catcher, the forward extremities of said lower bow member of said catcher being looped around said transverse bar for sliding movement therealong, said bottom of said catcher having cut-out portions adjacent each of its side edges in the region of support on said transverse bar for receiving one only of said connecting hooks while the other of said connecting hooks engages said transverse bar outside the opposite side wall of said catcher, a clip surrounding said strut, and a wire element strung through the looped end of said lower bow member and attached to said clip for maintaining the bottom of said catcher in offset relation relative to said lawn mower.

4. In a grass catcher adapted for coupling to a pair of hooks on the rear of a lawn mower and including an upper bow member joined to a lower bow member and the bottom wall of said catcher by a skirting; the combination therewith of a transverse bar for slidably supporting the fore edge of the bottom wall of said catcher, said transverse bar being slightly longer than the overall width of said bottom and bent upwardly to provide upstanding struts for supporting the forward extremities of the upper bow member of said catcher, the forward extremities of said lower bow member of said catcher being looped around said transverse bar for sliding movement therealong, said bottom of said catcher having cut-out portions slightly inwardly of each of its side edges adjacent said transverse bar for receiving one only of said connecting hooks while the other of said connecting hooks receives said transverse bar outside the opposite side wall of said catcher, a clip having its mid portion bent to substantially circumscribe one of said struts and having a pair of wings each provided with an aperture, a wire element strung through the looped end of said lower bow member and the apertures in the wings of said clip for securing said lower bow member against the strut on which said clip is mounted to maintain the bottom of said catcher in offset relation relative to said lawn mower.

JOHN C. KIRCHER, Jr.

References Cited in the file of this patent

UNITED STATES PATENTS

| Number | Name | Date |
| --- | --- | --- |
| 2,067,916 | Haffner et al. | Jan. 19, 1937 |
| 2,300,934 | Kircher | Nov. 3, 1942 |